United States Patent [19]
Rainer

[11] 3,715,339
[45] Feb. 6, 1973

[54] CHELATION POLYMER FROM NITRILO COMPOUND AND ETHYLENEIMINE COMPOUND

[75] Inventor: Norman B. Rainer, Richmond, Va.

[73] Assignee: Seekay Chemical Co., Inc., New York, N.Y.

[22] Filed: Dec. 9, 1970

[21] Appl. No.: 96,671

Related U.S. Application Data

[63] Continuation-in-part of Ser. No. 721,585, April 16, 1968, Pat. No. 3,580,891.

[52] U.S. Cl. ............... 260/78 A, 210/38, 260/2.2 R, 260/29.2 R
[51] Int. Cl. .............................................. C08g 20/06
[58] Field of Search .................... 260/78 A, 78 TF

[56] References Cited

UNITED STATES PATENTS

| | | | |
|---|---|---|---|
| 3,565,754 | 2/1971 | Dachs et al. | 260/78 A |
| 3,553,255 | 1/1971 | Marans | 260/78 A |
| 3,580,891 | 5/1971 | Rainier | 260/78 A |

*Primary Examiner*—Harold D. Anderson
*Attorney*—Norman B. Rainer

[57] ABSTRACT

A water-insoluble polymer is produced by reacting, under amide-forming conditions, a nitrilo compound selected from the group consisting of nitrilotriacetic acid, salts of nitrilotriacetic acid, and lower alkyl esters and amides of nitrilotriacetic acid, with a water soluble ethylene imine compound comprised of at least 80 percent by weight of recurring units of the formula $-NHCH_2CH_2-$. The water-insoluble polymer has the ability to absorb polyvalent metal ions from dilute aqueous solutions.

8 Claims, No Drawings

CHELATION POLYMER FROM NITRILO COMPOUND AND ETHYLENEIMINE COMPOUND

BACKGROUND OF THE INVENTION

This application is a continuation-in-part of U.S. patent application Ser. No. 721,585, filed Apr. 16, 1968 in the name of Norman B. Rainer and issued May 25, 1971 as U.S. Pat. No. 3,580,891.

This invention relates to a novel product useful for the removal of dissolved substances from solutions, and more particularly to a product useful for extracting from an aqueous solution dissolved metal ions present in small concentration or present in admixture with one or more other substances.

Classic techniques for the recovery of dissolved nonvolatile substances from solution generally involve evaporation of the solvent, or physical or chemical conversion of the dissolved substance to an insoluble form. In the case of dilute solutions and solutions containing more than one solute, such recovery techniques are generally unfeasible, particularly in large scale commercial operations. It is known that special absorbents such as ion exchange resins, activated charcoal, molecular sieves and cross-linked dextran gels can be employed for the extraction of dissolved substances from solutions. However, such absorbents have specific characteristics which restrict their use to a limited range of applications.

Certain absorbents lack sufficiently specific affinities to distinguish between similar solutes. For example, conventional ion exchange resins will act upon all similarly charged ions in a given solution. Activated charcoal, although effective in removing chromophoric organic compounds from solution, is generally ineffective in absorbing inorganic species, whether chromophoric or not. Molecular sieves and inorganic zeolites are similarly limited in utility to operations such as removal of volatile impurities from solvents, or exchange of sodium ions for calcium ions in water purification. Dextrans, though useful in many separations of dissolved substances, have limited specific affinities for solutes and function primarily by molecular filtration instead of selective molecular absorption. Although certain chelating resins are known, their production has been via expensive, multi-step syntheses.

It is an object of the present invention to provide a novel polymer product. It is another object of the present invention to provide a novel easily manufactured water-insoluble polymer having absorptive affinity for metal ions dissolved in aqueous media. It is still another object of the invention to provide a novel water-insoluble polymer in fluid-permeable granular form having the capability of selectively absorbing certain metal ions from aqueous media containing more than one species of metal ion. Other objects and advantages will appear hereinafter.

SUMMARY OF THE INVENTION

The objects of the present invention are accomplished in general by providing a water-insoluble polymer produced by reacting, under amide-forming conditions, a nitrilo compound selected from the group consisting of nitrilotriacetic acid, and the salts and lower alkyl esters and amides of said acid, with a water soluble ethylene imine compound comprised of at least 80 percent by weight of recurring units of the formula $-NHCH_2CH_2-$.

DESCRIPTION OF PREFERRED EMBODIMENTS

In preferred embodiments of the polymer product set forth in the above summary:

1. The nitrilo compound is nitrilotriacetic acid.
2. The polymer is in a granular form capable of forming a fluid-permeable aggregate of granules.
3. The ethylene imine compound contains at least four groups of the formula $-NHCH_2CH_2-$.
4. The polymer is capable of absorbing water in an amount between 100 and 600 percent of the dry weight of the polymer.
5. The polymer is capable of absorbing between 0.3 and 4.0 millimoles of divalent metal ion per gram of dry polymer.
6. The ratio of moles of nitrilo compound to moles of recurring units of the formula $-NHCH_2CH_2-$ in the ethylene imine compound is between 0.1 and 1.0.
7. The polymer is produced by reacting the nitrilo compound with the ethylene imine compound at a temperature between 110° and 190°C.
8. The polymer is in the form of its alkali metal or ammonium salt.

DETAILED DESCRIPTION OF THE INVENTION

Nitrilo compounds useful in the production of the polymer of this invention should be capable of forming a homogeneous solution with the co-reactant ethylene imine compound. Exemplary compounds include: (a) nitrilotriacetic acid, which dissolves in aqueous solutions of the ethylene imine compound, (b) water soluble amine and metal salts of nitrilotriacetic acid, and (c) lower alkyl esters and amides of nitrilotriacetic acid wherein the alkyl groups have preferably not more than six carbon atoms. The salts of nitriloacetic acid may be formed from the acid and appropriate bases in the preliminary stage of mixing of ingredients preparatory to the production of the polymer of this invention.

The ethylene imine compound may be derived from ethylene imine by a suitable addition reaction wherein a compound, usually containing an active hydrogen atom, opens and adds to the ethylene imine ring structure in accordance with the equation:

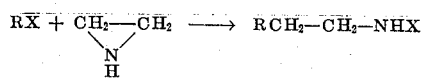

wherein RX represents a compound capable of adding to ethylene imine. The addition compound is capable of combining with successive ethylene imine molecules to produce a polymer of structure $R[-CH_2CH_2NH-]_nX$ wherein n represents the number of ethylene imine molecules added. Such polymers, useful in the practice of this invention, may be branched or linear. Branched polymers are produced when ethylene imine adds to the secondary nitrogen atoms of an existing poly (ethylene imine) chain, forming a polymer represented by the formula:

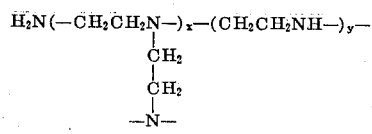

wherein $x$ and $y$ are integral numbers. The ratio of primary to secondary to tertiary nitrogens in such branched polymers may vary, but an approximate ratio of 1:2:1 is typical.

The molecular weight of the ethylene imine compound may range from 103 for the simplest member, diethylene triamine, having the formula $H_2NCH_2CH_2NHCH_2CH_2h_2$, to about 300,000 for highly polymerized ethylene imine. Mixtures of different suitable ethylene imine compounds may be employed. Structural moieties other than recurring ethylene imine units may be present in minor amounts accounting for not more than about 20 percent of the weight of the ethylene imine compound. Such moieties may be introduced via appropriate selection of the compound RX, noted above. The RX compound may, for example, be a monofunctional or polyfunctional alcohol, amine, or acid of short or long chain length.

The ethylene imine compounds useful in the practice of the present invention may also be derived from condensation reactions of ethylene diamine wherein a molecule of ammonia is liberated in the course of the condensation, as illustrated by the equation:

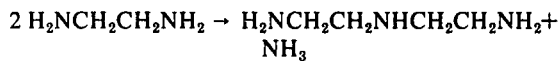

$$2\ H_2NCH_2CH_2NH_2 \rightarrow H_2NCH_2CH_2NHCH_2CH_2NH_2 + NH_3$$

In such manner, higher homologs may be prepared such as triethylene tetramine, tetraethylene pentamine, and pentaethylene hexamine. Thus, although not derived from ethylene imine, the condensation products contain recurring ethylene imine radicals of the formula $-NHCH_2CH_2-$ and are considered to be ethylene imine compounds within the purview of the present invention.

Useful ethylene imine compounds may also be prepared by the reaction of ethanolamine and ammonia under pressure in the presence of a metal hydrogenation catalyst, as disclosed in Australian Pat. No. 233,766 and German Pat. No. 14,480 (Mar. 17, 1958).

The amide-forming conditions employed for producing the polymer of the present invention are not a critical feature of the invention and are those well known to the art.

In the preferred mode of producing the polymer of the present invention, a homogeneous mixture is formed containing the nitrilo compound, the ethylene imine compound, and optionally, other ingredients such as catalysts, solvents, and modifying compounds in amounts up to 30 percent which become part of the polymer product. The homogeneous mixture is then subjected to conditions amenable to the formation of amide links between the carboxyl groups of the nitrilo compound and the primary and secondary nitrogens of the ethylene imine compound. A preferred amide-forming treatment involves heating the reaction mixture at a temperature of 110° to 190°C. with removal of condensation by-products such as water, alcohol or amines. Acidic pH, and catalysts useful in the production of amides can be employed to shorten the required time of heating, which may range from about 20 minutes to 10 hours. Completion of the polymer-forming reaction is indicated by cessation of evolution of condensation by-product, and formation of a hard, glassy polymer which is water-insoluble. The heating may be carried out in a chamber provided with evacuation means or inert sweep gas to enhance removal of condensation by-product and minimize possible oxidation. Higher temperatures and longer heating times produce polymer products of greater cohesive strength, reduced water absorption, and diminished chelating capacity. The polymerization can be carried out in molds to produce shaped articles, or impregnated in a porous support to produce composite structures, or in dispersion in an inert fluid to produce spherical particles, or by still other modes to secure desired physical forms of the polymer. The polymer product can be granulated by conventional means and can be subjected to leaching with water or other fluids to remove any traces of non-polymerized material. In similar manner, the polymer can be treated with chemicals which react with functional groups of the polymer.

The relative quantities of reactants employed in the production of the polymer are preferably chosen so that between 0.1 and 1.0 mole of the nitrilo compound is utilized per mole of recurring $-NHCH_2CH_2-$ groups in the ethylene imine compound. An especially preferred range of such molar ratio is between 0.2 and 0.7. When the ratio of reactants is below the preferred range, poor chelation properties are obtained. When the ratio is above the preferred range, the polymer becomes extremely brittle.

Other ingredients may be incorporated into the still-fluid polymerization mixture to secure special physical or chemical characteristics. Suitable additives include: (1) finely divided ingredients which function as a separate phase, retaining the original properties of the ingredient, as exemplified by activated carbon, silica gel, zeolites, alumina, reinforcing fibers, and the like; (2) additives which blend homogeneously with the polymer, such as low molecular weight polar polymers as polyamides and polyesters; and (3) compounds, in an amount up to 30 percent by weight of the polymer, containing an amide-forming functional group, by virtue of which the compound reacts to become chemically bonded to the polymer, and also containing another functional group, preferably containing nitrogen or oxygen atoms, and capable of modifying the chelation characteristics of the polymer. Exemplary members of the third group include: amino acids, hydroxy acids, amino alcohols, amino oximes, amino amidines, ethylene diamine tetra acetic acid and its derivatives, iminodiacetic acid and its derivatives, levulinic acid, hydrazino-acetic acids, hydroxyethyl glycine, and the like.

Ingredients may also be incorporated into the polymer by suitable treatment of the polymer after it has been formed, and preferably when it is in a granular condition. For example, aqueous solutions of solutes can be used to swell the dry polymer and thereby incorporate the solute into the polymer. Similarly, the polymer can be treated with compounds which react with either the tertiary nitrogens, the amidic hydrogens or the carboxyl groups of the polymer. It is preferable however, when maximum chelating power is desired, to maintain the maximum number of carboxyl groups on the polymer. When the nitrilo compound is an ester or amide, it is preferable to treat the resultant polymer with caustic to remove the alkyl groups by hydrolytic cleavage thereby creating carboxyl groups or the alkaline metal salts thereof.

The polymer of the present invention contains amide units represented by the formula:

(1) 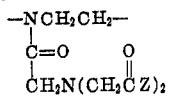

wherein Z may be OH, OM where M is a salt-forming cation such as a metal ion or an amine, O alkyl, or N alkyl. A certain amount of the nitrilo compound is utilized in cross linking and chain lengthening reactions to form the water-insoluble polymer of the present invention. In this role, the nitrilo compound reacts bi-functionally, forming an amide link at a secondary amine or terminal primary group of two different ethylene imine compound molecules, as illustrated in formulas 2 and 3 wherein A and B represent two different molecules or portions of molecules of ethylene imine compound. In view of the cross linked nature of the polymer of this invention the molecular weight is indeterminate but can be assumed to be very large.

(2) 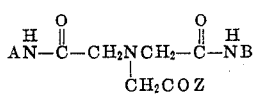

(3) 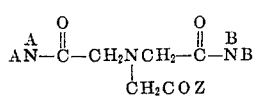

Although the chain lengthening and cross linking function of the nitrilo compound is important, excessive utilization of the nitrilo compound for this purpose leads to diminished chelation powers. The probable reason for this effect is that monofunctionally reacted nitrilo compound, which becomes a pendant group on the polymer chain, as illustrated in formula (1), contains the N, N bis (carboxymethyl) amine structure, said structure having better chelating ability than the N mono (carboxymethyl) amine structure of formulas 2 and 3. Polymers of improved chelation capability are therefore produced by (1) selecting high molecular weight ethylene imine compounds which need relatively little chain lengthening or cross linking to yield water insoluble polymers, and (2) adjusting the proportions of the reactants so as to incorporate the maximum amount of nitrilo compound in the polymer.

The polymer product is insoluble in water. In dry form, it is a brittle, non-crystalline, glassy solid. When immersed in water at room temperature it swells, absorbing water in an amount preferably between 100 and 600 percent of the dry weight of the polymer. At water absorption levels lower than about 100 percent, the polymer exhibits slow ion exchange characteristics. At water absorption levels above about 600 percent, the polymer is found to have inadequate cohesive strength for prolonged or repeated use. An especially preferred range of water absorption is between 120 and 300 percent. The water absorption level of the polymer is generally found to increase with decreasing values of the ratio of nitrilo compound to ethylene imine compound. The water absorptivity is measured on polymer in granular form, permitting excess water occluded between granules to drain off prior to weighing of a sample for analysis. Different salt forms of the same polymer may vary 50 to 100 percent in water absorptivity. The polymer generally has a light amber color, and usually takes on the color of absorbed chromophoric ions, thereby permitting visual observation of the absorption process.

When employed as a chelating resin, more rapid rates of absorption are obtained when the polymer is initially in the form of its alkalie metal or ammonium salt, preferably the sodium salt. Polyvalent ions have greater affinity for the polymer than sodium ions, and displace the sodium ions as they absorb onto the polymer. Absorbed polyvalent ions can generally be eluted from the polymer by treatment with dilute aqueous solutions of strong acids such as HCl and $H_2SO_4$. The polymer, following elution with acid and neutralization with dilute NaOH solution, is ready for re-use in the chelation of metal ions.

The polymer, in its initial absorption cycle, is capable of absorbing between 0.3 and 4.0 millimoles of divalent metal ion per gram of dry polymer. In subsequent absorption cycles, a gradual diminution of absorption capacity may be observed due to in-complete elution of previously absorbed ions. The affinity of the polymer for certain metal ions such as $Fe^{+++}$, $Cu^{++}$, $Co^{++}$, $Ni^{++}$ is so strong that it will absorb the ions from solutions containing less than a few parts per million of these ions.

The specificity of the polymer for particular ions can be modified through the use of co-reactant monomers having appropriate functional groups which become incorporated into the polymer, or by use of specially modified ethylene imine compounds. The specificity of the polymer for certain metal ions is such that it can absorb trace heavy metal ions from sea water. By way of contrast, an ordinary ion exchange resin cannot distinguish between similarly charged ions and would consequently saturate with the sodium ions of sea water.

In preferred embodiments the polymer may be employed in the form of granules ranging in size from about several microns to one quarter inch. In any given aggregate of said granules there should preferably be less than 25 percent by weight of granules having a diameter deviating more than five-fold from the mean granule diameter since excessive particle size distribution gives rise to sedimentation effects and impedes fluid flow through a bed of said aggregate. Granule size may be measured by standard screen sieves. The aggregate may be employed in the form of a contiguous bed wherein the particles are in contact with surrounding particles, or the aggregate may be employed in admixture with a fluid-permeable substance such as a filter-aid.

When used in granular form for the treatment of aqueous solutions, the polymer may be employed in an absorption column with upward or downward fluid flow, or the granules may be slurried with the solution to be treated, and the mixture separated by filtration, sedimentation, or flotation. In another mode of utilization, the granules may be enclosed within a porous envelope which may be immersed in a flowing stream of solution to be treated or dragged through a relatively stationary solution. In still other modes, the granules may be sintered or adhered together to form a self supporting, permeable structure, or the polymer may be incorporated within a permeable matrix such as an open sponge or fibrous structure, or the granules may be incorporated into an acrylic hydrogel polymer, as disclosed in U.S. Pat. No. 3,220,960, having high diffusivity for water and solutes.

The polymer of the present invention is useful in applications other than selective absorption of metal ions. It can be used in column operations to separate mixtures of dissolved organic compounds. In the copper-saturated form, the polymer is capable of absorbing amino acids from dilute aqueous solution, thereby providing a technique for sampling the amino acid content of natural bodies of water. The polymer, containing an absorbed substance, can be utilized as a slow release substrate for the absorbate. Thus, the polymer may serve as a carrier for humectants, insecticides, bactericides, desiccants, odorants, catalysts, herbicides, oxidants and the like and as a general carrier for liquid compounds which must be utilized in non-liquid form.

A further understanding of my invention will be had from a consideration of the following examples which illustrate certain preferred embodiments. All parts and percentages are by weight unless otherwise indicated. It is understood that the instant invention is not to be construed as being limited by said examples or by the details therein.

EXAMPLE 1

1.894 parts of nitrilotriacetic acid were mixed with 1.583 parts poly(ethylene imine) having a molecular weight of about 1800 (PEI-18, a product of the Dow Chemical Company, Midland, Michigan) and 20 parts deionized water at 50°C. until a homogeneous solution of pH 6.8 was obtained. The solution was evaporated in shallow trays in an air circulating oven at 120°C. to produce a thick syrup. The syrup was then heated at 153°C. for two hours. A foamed glassy amber-colored solid polymer was obtained.

The solid polymer was soaked overnight in a 5 percent aqueous solution of sodium hydroxide at room temperature. By virtue of the swelling action of the aqueous solution, the polymer formed a mass of water-swollen granules. The mixture was adjusted to pH 7.5 by addition of further sodium hydroxide solution, and was poured into a stack of nested sieve screens. With the aid of a flowing stream of water, the granules were simultaneously washed and separated by size.

2.588 parts of washed, dry polymer were obtained in mesh sizes ranging from 20 to 200 (U.S. Sieve Series, ASTM E-11-61). This represents a 74.5 percent yield based on the starting materials. The polymer absorbs 3.1 times (310 percent) its weight of water. When placed in a one I.D. column and treated with a 1 percent solution of copper sulfate, the resin, initially of translucent amber appearance, formed a sharply defined dark blue band as it absorbed copper. The copper-saturated resin was found to contain 1.61 millimoles of copper per gram of dry resin. By treating the copper-saturated polymer with 5 percent aqueous HCl solution, copper is eluted from the column. The resin however, retains a light greenish coloration.

EXAMPLE 2

3.844 parts nitrilotriacetic acid were mixed with 2.015 parts poly(ethylene imine) (PEI-18) and 30 parts water at a temperature of 95°C. until a homogeneous solution resulted. The solution was then further treated as in Example 1 to produce 4.60 parts of washed, dry resin (78.5 percent yield), having absorption affinity for $FE^{++}$, $Co^{++}$, $Ni^{++}$, $Cu^{++}$, and other metal ions. The copper-saturated resin was found to contain 2.2 millimoles of copper per gram of dry resin. The resin absorbs 1.9 times its weight of water, by immersion in water at room temperature.

EXAMPLE 3

2.01 parts nitrilotriacetic acid were titrated to pH 3.9 with 1.24 parts poly(ethylene imine) (PEI-18) dissolved in 32 parts water. The titrated solution was dried of water by heating at 95°C. for several hours. The water-free residue is an amber, water-soluble tar. The residue was placed in trays to a depth of three-eighths inch and was heated at 160°C. for 1 hour. The resultant product was a bubbled amber-colored glassy resin. The resin was immersed in water for 10 hours at 35°C., whereupon the resin broke into swollen granules containing 153 percent absorbed water, based on the dry polymer.

The granules were sieved to a 20/60 mesh size using a stream of water, and the sieved, washed granules were placed in a vertical glass column having a 1 inch inside diameter. A 5 percent aqueous $NH_4OH$ solution was passed through the granules until the effluent was basic. The granules were then washed with distilled water until the effluent was neutral. A 2 percent aqueous solution of copper sulfate was passed through the column. The progress of absorption was indicated by a sharply defined blue zone which descended the column. Upon saturation, the column was washed with distilled water and the polymer granules were removed, dried, and found by analysis to contain 1.3 millimoles of copper per dry gram of resin.

EXAMPLE 4

2.023 parts nitrilotriacetic acid were titrated to pH 3.9 with an aqueous solution containing 1.032 parts poly(ethylene imine) having an average molecular weight of 600. The solution was processed in the manner described in Example 3 to obtain a polymer which absorbs 1.83 times its weight of water.

The polymer was neutralized with dilute aqueous sodium hydroxide solution, washed with water, and then employed as 20/50 mesh granules to treat an aqueous solution containing 10 percent sodium chloride and 0.5 percent ferric chloride. The granules were selective in the removal of ferric ion. At saturation, the polymer granules contained 1.7 millimoles of iron per gram of dry polymer.

EXAMPLE 5

4.027 parts nitrilotriacetic acid were mixed with 1.980 parts poly(ethylene imine) (PEI-18) and 30 parts water at 25°C. The resultant pH of the mixture was 2.9, and not all the nitrilotriacetic acid was dissolved. The pH OF the mixture was adjusted to 3.9 with dilute aqueous NaOH solution, at which point all the nitrilotriacetic acid dissolved. The solution was evaporated at 100°C. in trays. The residue was heated at 158°C. for 60 minutes to produce a bubbled glassy polymer. The polymer was washed with water, granulated, sieved and neutralized to pH 7.0 with dilute KOH solution.

The polymer was found to have a water absorbency of 148 percent. When utilized to absorb copper ions from a dilute aqueous solution of copper sulfate, the copper-saturated polymer was found to contain 14.5 percent copper, or approximately 2.3 millimoles of copper per gram of dry resin.

EXAMPLE 6

The process of Example 4 was repeated with the exception that the polymerization was carried out at a temperature of 118°C. for 4 hours. The resultant polymer product possesses a water absorption capacity of 230 percent and has a chelation capacity of 3.2 millimoles of copper per gram of dry polymer.

The polymer was pulverized and wet-sieved to 80/160 mesh. The sieved material was slurried with diatomaceous earth filter aid, and the mixture was employed to coat the filter fabric of a plate-and-frame filter press. Electroplating waste solutions adjusted to pH 7.0 were passed through the filter press. The polymer was effective in removing chromium, nickel, copper, cobalt and iron. By eluting the polymer with dilute aqueous HCl, metals such as chromium, nickel and cobalt were separated from copper and iron.

EXAMPLE 7

1.321 parts trimethyl ester of nitrilotriacetic acid were mixed with 0.288 parts poly(ethylene imine) (PEI–18) and 5 parts water to form a homogeneous solution. The solution was then heated at 125°C. for 3 hours in an uncovered tray. The resultant polymer was treated with a 5 percent aqueous solution of KOH at 35°C. for one hour. The polymer thus treated has a water absorbency of 310 percent, and a chelation capacity of 1.8 millimoles per gram.

EXAMPLE 8

Thirty parts nitrilotriacetic acid were mixed with 10 parts of poly(ethylene imine) having a molecular weight of 60,000, 200 parts distilled water, and sufficient potassium hydroxide to adjust the pH to 4.0. The homogeneous solution was evaporated in a shallow tray at 50°C. for 10 hours to produce a water soluble glassy solid. The solid was heated at 160°C. for 2 hours. A bubbled, water-insoluble pale amber resin was obtained. The resin was immersed in 5 percent aqueous NaOH solution for 8 hours at room temperature. The immersion treatment causes the resin to fragment into water-swollen granules containing 110 percent water (based on the dry polymer).

The water-swollen, sodium neutralized granules were sieved to 20/60 mesh size (all granules pass through a 20 mesh screen and are retained on a 60 mesh screen). The sieved granules were placed in a ¾-inch I.D. glass column. An aqueous solution containing 1% $CuCl_2$ and 1% $CoCl_2$ was gravity fed through the top of the column. The copper absorbed as an upper band, the cobalt absorbing in a lower band. The rate of absorption appears slower than in the case of the polymer of Example 3 which was made from a lower molecular weight of poly(ethylene imine), and has higher water absorbency. Upon elution with 0.5 percent HCl solution, the cobalt was separated from the copper. Elution with 5% HCl solution indicated that removal of the absorbed ions is more rapid and more complete than in the case of the polymer of Example 3.

EXAMPLE 9

Twenty-three parts nitrilo tris (N-methyl acetamide) were mixed with 43 parts pentaethylene hexamine, 200 parts water and 0.5 part stannous octoate. The mixture was evaporated to dryness at a temperature of 150°C. The residue was heated at 160°C. for one hour to produce a resinous product. The resin was soaked in 5 percent aqueous NaOH for 12 hours at room temperature. The resultant product was found to absorb 1.6 times its weight of water and has an absorption capacity of about 0.4 millimoles per gram of dry polymer for ions such as iron and copper.

EXAMPLE 10

57.3 parts of nitrilotriacetic acid were mixed with 43 parts diethylene triamine and 200 parts water to form a homogeneous solution. The solution was evaporated to dryness and the residue was heated at 140°C. for 3 hours to form a bubbled water-insoluble polymer. The polymer, following neutralization with NaOH and washing, was found to have a chelation capacity of 0.9 millimoles per gram.

By way of comparison, the same experiment was carried out with the exception that the diethylene triamine was replaced with an equal weight of ethylene diamine, which is not an ethylene imine compound within the purview of the present invention. The resultant polymer exhibited a chelation capacity of only 0.4 millimoles per gram, thereby demonstrating the improvement afforded by the ethylene imine compounds of the present invention, which enable the nitrilotriacetic acid to become pendant groups on the chelation polymer.

EXAMPLE 11

180 parts nitrilotriacetic acid and 20 parts hydrazino-diacetic acid $H_2NN(CH_2CO_2H)_2$ were mixed with 300 parts water and 105 parts of an ethylene imine compound made by the addition of 21 moles of ethylene imine to one mole of triethylene glycol. The homogeneous solution was evaporated to dryness. The residue was heated at 165°C. for 45 minutes in a vacuum chamber to produce a water-insoluble glassy polymer.

Following neutralization with NaOH solution and washing, the polymer was found to have a water absorptivity of 3.3 times its dry weight (or 330 percent) and a chelation capacity of 1.8 millimoles of copper ion per gram of polymer. This polymer appears to have a greater affinity for nickel than the polymer of Example 3.

EXAMPLE 12

170 parts nitrilotriacetic acid were mixed with 20 parts pentaethylene hexamine, 23 parts poly (ethylene imine) of 60,000 molecular weight, and 400 parts water to form a homogeneous solution. The solution was evaporated to dryness at 115°C., and the residue was heated at 158°C. for 1 hour in an evacuated chamber. The resultant water-insoluble polymer, following neutralization with NaOH solution and washing, was found to have a water absorption capacity of 165 percent and a chelation capacity of 3.3 millimoles of divalent ion per gram of dry polymer.

I claim:

1. A water insoluble polymer consisting essentially of the polymeric product produced by the reaction, under amide-forming conditions, of a nitrilo compound selected from the group consisting of nitrilotriacetic acid and the salts and lower alkyl esters and amides of nitrilotriacetic acid, with a water soluble ethylene imine compound consisting essentially of at least about 80 percent by weight of recurring units of the formula —$NHCH_2CH_2$—, the ratio of moles of nitrilo compound to moles of —$NHCH_2CH_2$— units being between about 0.1 and 1.0.

2. The polymer of claim 1 wherein the nitrilo compound is nitrilotriacetic acid.

3. The polymer of claim 1 in a granular form capable of forming a fluid-permeable aggregate of granules.

4. The polymer of claim 1 wherein the ethylene imine compound contains at least four recurring units of the formula —$NHCH_2CH_2$—.

5. The polymer of claim 1 having a water absorption capacity between about 100 and 600 percent of the dry weight of the polymer.

6. The polymer of claim 1 having an absorption capacity for divalent metal ions of between about 0.3 and 4.0 millimoles of metal ion per gram of dry polymer.

7. The polymer of claim 1 in the form of its alkali metal or ammonium salt.

8. A water insoluble polymer consisting essentially of the polymeric product produced by heating, at a temperature between about 110° and 190°C, a homogeneous composition made by mixing nitrilotriacetic acid or a salt of said acid, with a poly (ethylene imine), having a molecular weight of at least $10^3$, and water, and continuing said heating, with removal of water, at least until solidification occurs.

* * * * *

UNITED STATES PATENT OFFICE
CERTIFICATE OF CORRECTION

Patent No. 3,715,339    Dated February 6, 1973

Inventor(s) Norman B. Rainer

It is certified that error appears in the above-identified patent and that said Letters Patent are hereby corrected as shown below:

Column 3, line 8, the formula reading $NHCH_2CH_2h_2$ should read -- $NHCH_2CH_2NH_2$ --. Column 4, line 68, "kaline" should read -- kalie --. Column 7, line 53, after the word "one" insert -- inch --. Column 8, line 60, "OF" should read -- of --. Column 12, line 14, delete the comma appearing after the expression "(ethylene imine)".

Signed and sealed this 8th day of January 1974.

(SEAL)
Attest:

EDWARD M. FLETCHER, JR.
Attesting Officer

RENE D. TEGTMEYER
Acting Commissioner of Patents